(12) United States Patent
Wobben

(10) Patent No.: US 7,549,264 B2
(45) Date of Patent: Jun. 23, 2009

(54) TOWER OF A WIND POWER INSTALLATION

(76) Inventor: Aloys Wobben, Argestrasse 19, Aurich (DE) 26607

( * ) Notice: Subject to any disclaimer, the term of this patent is extended or adjusted under 35 U.S.C. 154(b) by 630 days.

(21) Appl. No.: 10/497,840

(22) PCT Filed: Dec. 6, 2002

(86) PCT No.: PCT/EP02/13844

§ 371 (c)(1),
(2), (4) Date: Nov. 22, 2004

(87) PCT Pub. No.: WO03/048570

PCT Pub. Date: Jun. 12, 2003

(65) Prior Publication Data

US 2005/0091938 A1     May 5, 2005

(30) Foreign Application Priority Data

Dec. 7, 2001    (DE) ................................ 101 60 306

(51) Int. Cl.
    *E04C 3/00*      (2006.01)
(52) U.S. Cl. .......................................... 52/848; 52/834
(58) Field of Classification Search ............... 52/745.17, 52/726.1, 726.3, 726.4, 736.1, 737.1, 737.3, 52/651.01, 655.1, 169.13, 40; 219/200, 210, 219/213
See application file for complete search history.

(56) References Cited

U.S. PATENT DOCUMENTS

| | | | |
|---|---|---|---|
| 1,997,969 A * | 4/1935 | Hopkins | .................. 219/137 R |
| 2,172,703 A * | 9/1939 | Freyssinet | ..................... 264/34 |
| 3,270,480 A * | 9/1966 | Beecker | ....................... 52/726.4 |

(Continued)

FOREIGN PATENT DOCUMENTS

DE    195 47 901 A1    6/1997

(Continued)

OTHER PUBLICATIONS

European Patent Office, Patent Abstract for JP 09-324460, Dec. 16, 1997.

(Continued)

*Primary Examiner*—Richard E Chilcot, Jr.
*Assistant Examiner*—Jessica Laux
(74) *Attorney, Agent, or Firm*—Seed IP Law Group PLLC

(57) ABSTRACT

There are various pylons of wind power installations, primarily lattice mast pylons, tubular steel pylons or concrete pylons. In the case of pylons of concrete, there are various possible ways of producing same, inter alia also erecting pylons from ready-made reinforced concrete parts, wherein the individual ready-made reinforced concrete parts form respective segments which are laid one upon the other and which are then braced to each other. The object of the invention is to speed up construction of a pylon comprising segments disposed in mutually superposed relationship, with a bonding material between the segments. A pylon of a wind power installation, wherein the pylon comprises mutually superposed segments and there is a bonding material between the mutually superposed segments, and a heating element is provided in the upper region of the downwardly disposed segment and/or in the lower region of the upwardly disposed segment on the side of the segment, which is towards the oppositely disposed segment.

7 Claims, 4 Drawing Sheets

U.S. PATENT DOCUMENTS

| | | | |
|---|---|---|---|
| 3,676,641 A * | 7/1972 | Olson | 219/200 |
| 4,141,187 A * | 2/1979 | Graves | 52/173.1 |
| 4,238,105 A * | 12/1980 | West | 249/78 |
| 4,640,266 A * | 2/1987 | Liff | 119/69.5 |
| 4,803,819 A * | 2/1989 | Kelsey | 52/309.1 |
| 6,350,969 B1 * | 2/2002 | Rothchild | 219/505 |
| 2003/0061781 A1 * | 4/2003 | Smith | 52/720.1 |
| 2004/0062609 A1 * | 4/2004 | Heierli | 405/124 |

FOREIGN PATENT DOCUMENTS

| | | |
|---|---|---|
| DE | 19703856 A1 | 8/1998 |
| DE | 298 09 541 U1 | 10/1999 |
| DE | 100 33 845 A1 | 1/2002 |
| JP | 2000283019 | 10/2000 |
| WO | WO 94/05485 | 3/1997 |

OTHER PUBLICATIONS

European Patent Office, Patent Abstract for JP 2001-317678, Nov. 16, 2001.

* cited by examiner

TOWER OF A WIND POWER INSTALLATION

FIELD OF THE INVENTION

This invention relates to a method of assembling a pylon for a wind power installation, and more particularly, to a structure and method for connecting two segments of a pylon to each other.

BACKGROUND OF THE INVENTION

There are various pylons of wind power installations, primarily lattice mast pylons, tubular steel pylons or concrete pylons. In the case of pylons of concrete, there are various possible ways of producing same, inter alia also erecting pylons from ready-made reinforced concrete parts, wherein the individual ready-made reinforced concrete parts form respective segments which are laid one upon the other and which are then braced to each other. A process for producing a pylon from ready-made reinforced concrete parts is known for example from DE 100 33 845.3.

In the case of such pylons of concrete segments, the individual segments (in practice each segment is of a different shape) are not only simply laid one upon the other, but they are also connected to each other by way of a suitable bonding material. Those bonding materials can be a polymer (for example epoxy resin) and the layer thickness of the bonding material is usually at least 2 mm.

When now such a segment-type pylon is produced, the procedure, after positioning a segment, involves applying to the top side of the segment the bonding material which then in turn can harden after the next segment has been laid in place. That in turn is followed by application of bonding material to the freshly laid segment, and so forth.

Under some circumstances however a problem can arise with the bonding material when the pylon is erected at a cold time of the year. More specifically, the bonding material usually requires a minimum temperature for it to harden and, if the outside temperature is low, for example around 0° C., either the bonding material does not harden or hardening takes a very long period of time, which considerably delays total erection of the pylon.

BRIEF SUMMARY OF THE INVENTION

One object of the invention is to speed up construction of a pylon comprising segments disposed in mutually superposed relationship, with a bonding material between the segments.

In accordance with the invention that object is attained by the features of claim 1. Advantageous developments are set forth in the appendant claims.

In accordance with the invention, at least one side of segments which are disposed in mutually superposed relationship is provided with a heating module and said heating module preferably comprises a simple heating wire, a PCT resistance wire or also steel wire, such as welding wire.

If a high current, for example in the range of 70 to 150 A, flows through such a wire, then the wire heats up and the bonding material applied to the top side of the segment can harden quickly in the desired manner, in spite of cold outside temperatures.

To achieve a good heating effect, it is advantageous if the heating module is provided over the entire surface area within the upper region of a concrete segment in order to achieve maximum possible transmission of heat to the bonding material.

That great heating effect can also be achieved for example if a heating wire is arranged in a meander configuration within the upper region in the concrete of the pylon segment and, of that heating wire, then only the two connecting terminals are still accessible. It is then possible to connect to those connecting terminals for example a conventional welding transformer which is capable of passing a high current through wire, so that then the desired heating effect in relation to the upper region of the segment and therewith also the bonding material occurs.

BRIEF DESCRIPTION OF THE SEVERAL VIEWS OF THE DRAWINGS

The invention is illustrated hereinafter with reference to the drawing in which.

DETAILED DESCRIPTION OF THE INVENTION

Figure 1:
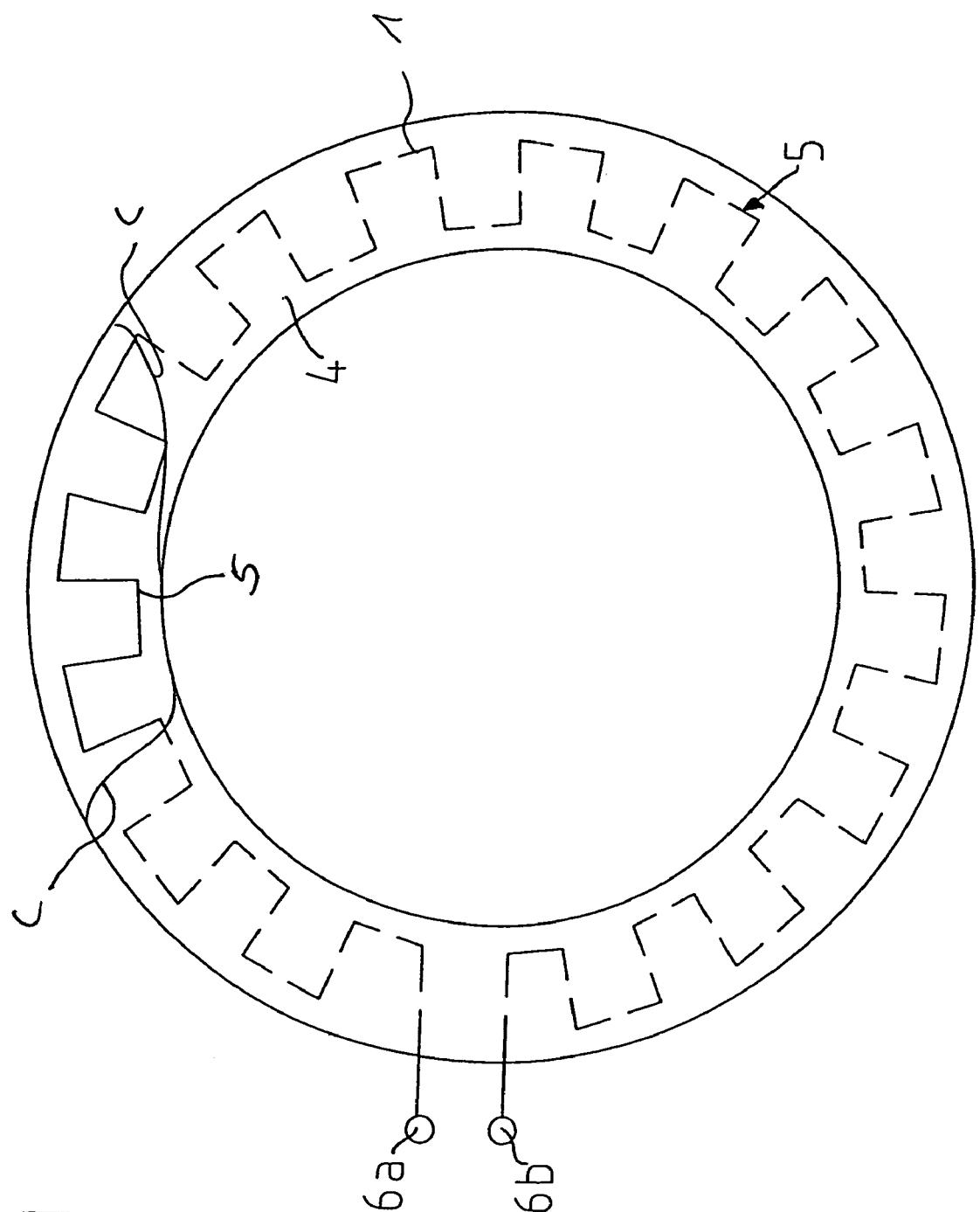
FIG. 1 shows a top plan view on to a pylon segment according to the invention.

FIG. 1 shows a round pylon segment 4, viewing from above with a cut-away cross-section at line c-c removed from the surface of a pylon segment. It is to be seen in this respect that a heating module 1 is positioned in the upper region 2 of the pylon segment, the heating module comprising a heating wire 5 which is disposed in a meander configuration within the concrete segment 4, as shown. It is also possible to see two connecting terminals 6a, 6b for the heating wire 5, to which it is possible to connect for example a welding transformer which generates a high current which can be passed through the heating wire 5 so that the heating wire 5 is heated and then also provides for heating the concrete in the uppermost region of the segment so that the bonding material on the segment can harden.

Figure 4:
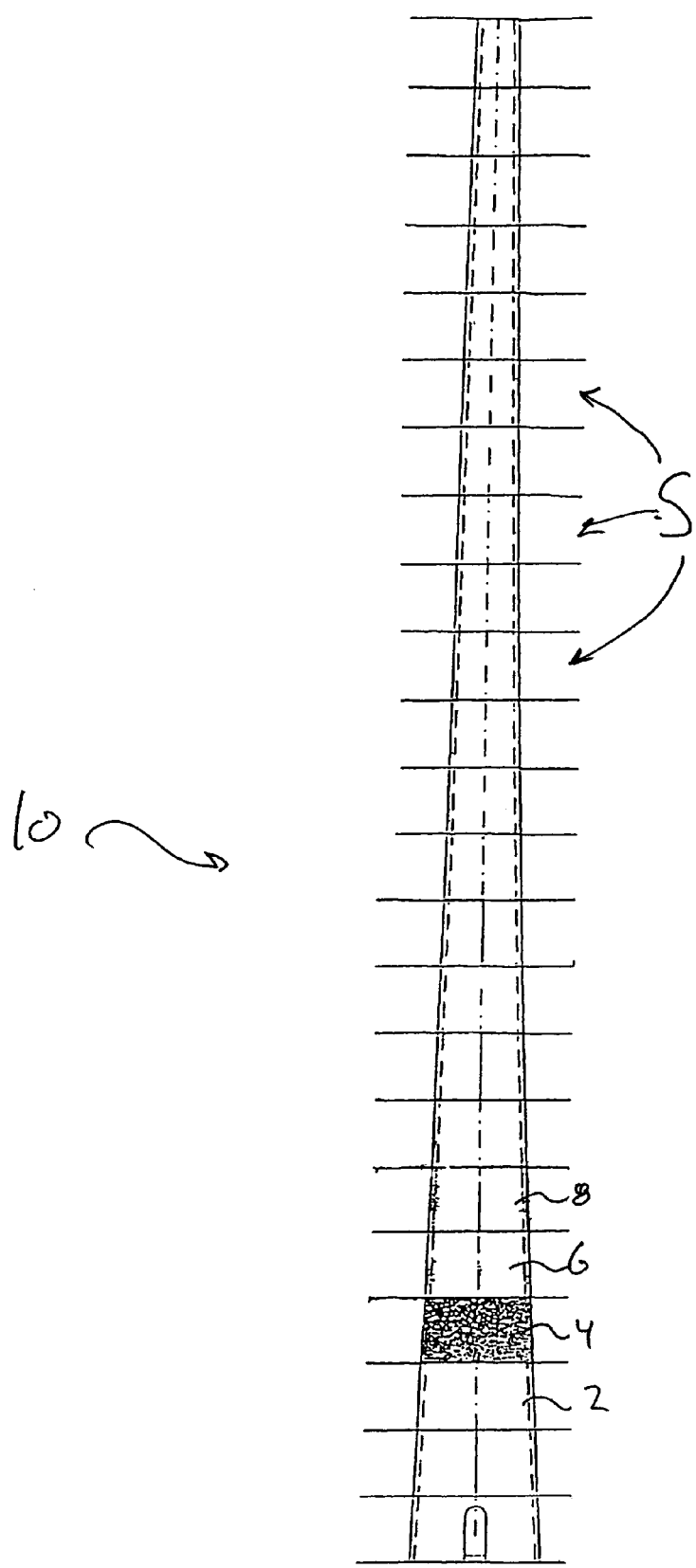
FIG. 4 shows a view of a pylon, consisting of pylon segments, of a wind power installation.

FIG. 4 shows a completed pylon 10 being composed of a plurality of segments labeled generally S. Some of the segments are labeled to specific reference numbers, such as segments 2, 4, 6, 10, etc. A group of the segments are prefabricated and stacked on top of each other in a superimposed relationship as shown in FIG. 4 in order to construct a complete pylon 10 which as a wind power installation at the top thereof for the generation of electrical power from wind energy.

Figure 3:
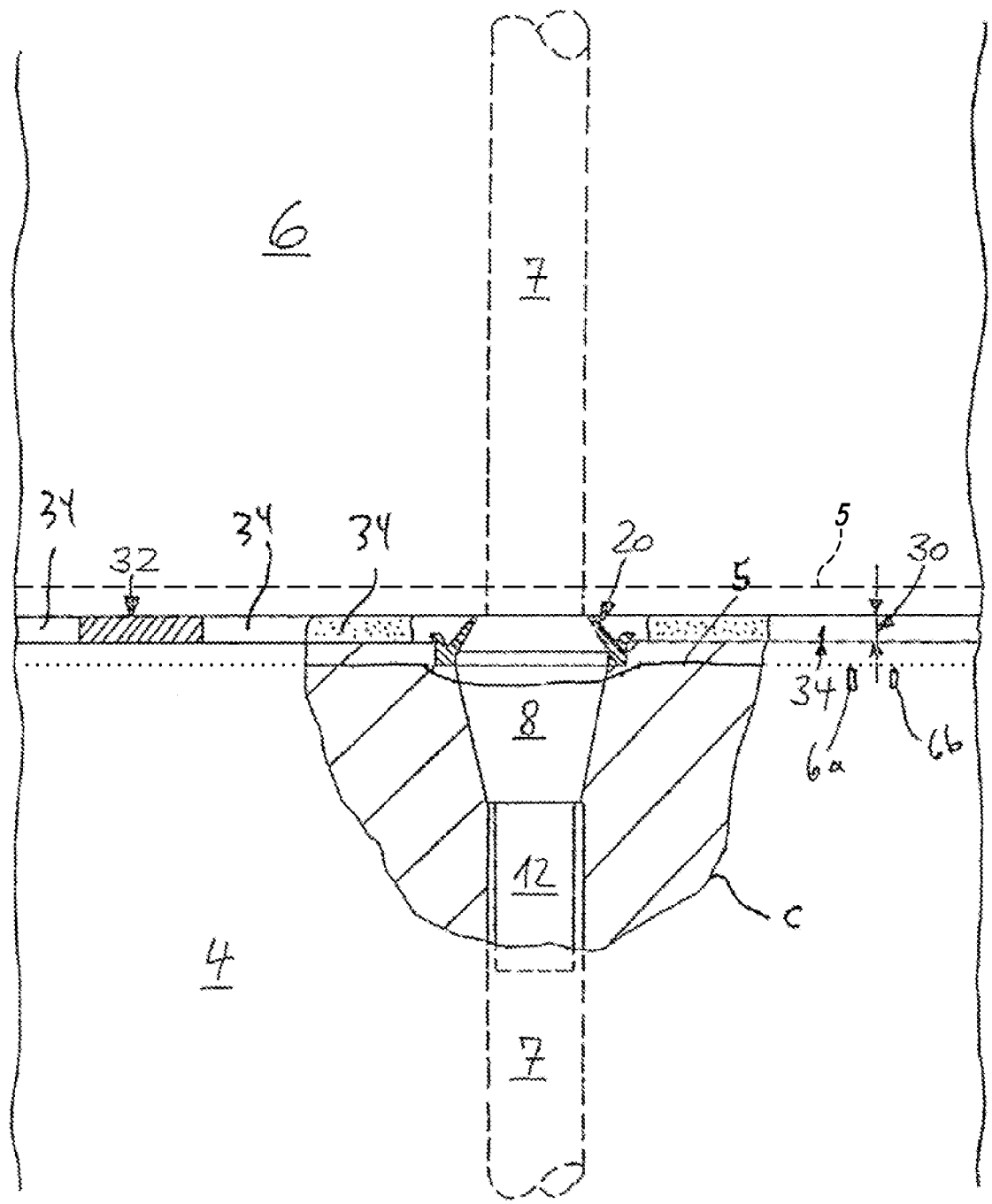
FIG. 3 shows an illustration of the manner of laying a heating wire in the pylon segment when segments are disposed in mutually superposed relationship.

FIG. 3 shows an illustration of segments which are laid in mutually superposed relationship. Illustrated here are two segments 4, 6 which are arranged in mutually superposed relationship and of which the lower segment 4 is shown in a cut-away cross-section at line c in the region of a reinforced concrete arrangement (which is not of particular significance here). It is also possible to see there the heating wire 5 which is laid in the upper region of the pylon segment. The segments 4 and 6 are arranged in mutually superposed relationship in such a way that casing tubes 7 of a tensioning device in the segments 4, 6 are disposed in substantially aligned mutually opposite relationship. The tensioning device 8 is let into the lower segment 4 in positively locking relationship and the upper edge of the peripherally extending rim terminates flush with the surface of the segment 4. The tubular portion 12 engages into the casing tube 7 which is integrated in the segment 4.

A seal 20 is fitted in the part of the device 8, which is provided to receive the seal 20, and the seal bears with its top side firmly against the lower segment 6.

When erecting the pylon comprising the segments 4, 6, firstly preferably three spacers and shims 32 are arranged distributed at approximately equal spacings around the periphery on the upwardly facing surfaces of the segment 4 which was fitted last, being the lower segment.

The spacers 32 are preferably of wood and are of a height of about 5 mm (depending on the surface roughness of the segments), which corresponds to the intended spacing 30 between the segments 4, 6 after assembly. The modulus of elasticity of wood is in a range which on the one hand makes it possible for wood to be able to withstand for some time the forces which occur in the pylon, but which on the other hand provides that irregularities and unevenness in the mutually opposite surfaces of the segments 4, 6 are pressed into the wood and thus flaking-off or chipping-off phenomena on the segments 4, 6 are avoided.

In that respect, the spacers 32 act as shims so that leveling of the segments 4, 6 can be achieved by suitable selection of the height of the spacers 32 (the spacing may also be approximately only 2 mm), in accordance with the inevitable production inaccuracies of the segments 4, 6.

Before the operation of laying the upper segment 6 and the lower segment 4, a bonding material 34 is applied to the upper surface of the segment 4 to cover the area thereof. In that respect the positions at which the casing tubes 7, 8 in the segments 4, 6 and the casing tube 7 in the upper segment 6 and the device 8 with the seal 20 in the lower segment 4 are in mutually opposite relationship are left clear upon applying the bonding material 34, insofar as the bonding material 34 can be applied as far as the projection 23.

The bonding material 34 which is applied to cover the surface area is preferably an epoxy resin (or another polymer) and is applied at least in a layer thickness of about 2 to 6 mm which substantially corresponds to the intended spacing 30 between the segments 4 and 6.

When such a pylon is constructed at the cold time of year, where the temperature is not infrequently below the freezing point for the entire day (also because wind power installations are also erected at very unprotected positions), the epoxy resin normally hardens, if at all, only very slowly, which overall greatly slows down the procedure involved in erecting the pylon, because further positioning of further segments also presupposes hardening of the epoxy resin between the lower segments which have already been positioned.

In the case of the pylon according to the invention the pylon construction team can then activate the heating modules or heating means already provided in the segments, by for example a welding transformer being connected to the heating wire by way of the connecting terminals 6a, 6b. The welding current is in a range of 60 to 150 A (or below that or above it). The segment 4 now heats up at its top side, and the bonding material also, and the bonding material can harden as desired within a short time.

As the provision of a heating module in the form of a normal steel wire or heating wire or welding wire is very convenient and inexpensive, it can remain in the concrete of the segment even after the pylon has hardened. In any case a pylon segment includes a plurality of steel bracings in order to increase its strength.

In order to avoid the heating wire 5 coming into contact with other electrically conducting parts in the segment, it may also be appropriate if the heating wire 5 is provided with a heat-conducting but electrically insulating layer. Such insulation however should be resistant in respect of shape and heat at temperatures of up to 60 to 100° C.

Figure 2:
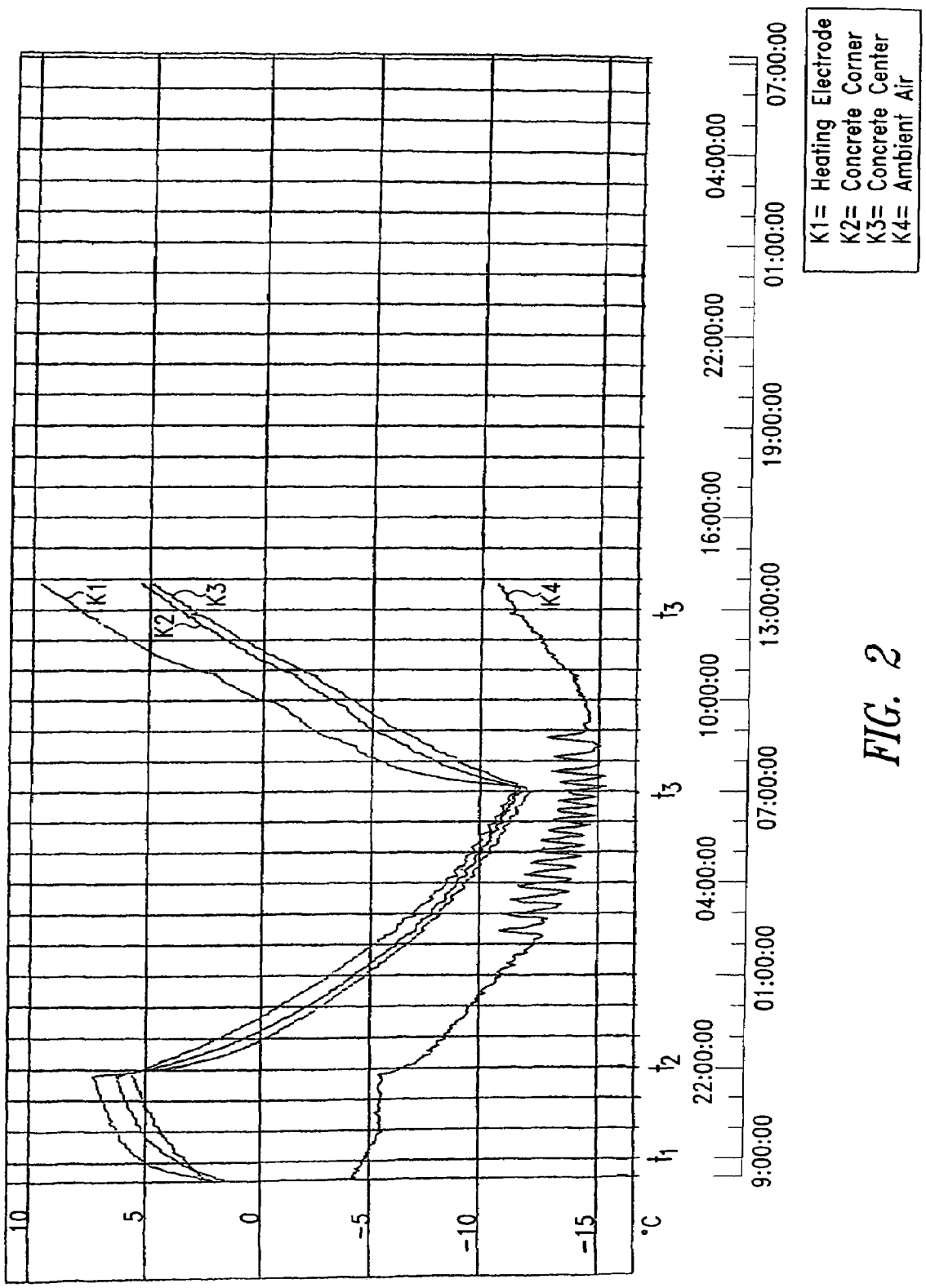
FIG. 2 shows a measurement curve in respect of various measurement points and the ambient air of a pylon segment according to the invention.

FIG. 2 shows the temperature characteristic of an embodiment of the invention. The temperature measurement starts in this graph at approximately 1900, which corresponds to 7:00 p.m. The 7:00 p.m. time is at approximately time T1 as shown on the graph. The temperature plot shows the ambient temperature, as well as the concrete and heating line temperatures as time continues. At time T1, the outside ambient temperature gradually drops below −5° C. At time T2, the concrete as well as the heating line also begins to fall in temperature towards a low temperature following the temperature drop of the ambient air which occurs at approximately 2200 (namely 10:00 p.m.). It can be seen in this respect how the outside temperature curve firstly drops to a range of about −12 to −15° C.

Above the temperature curve there are the curves K1, K2 and K3, wherein K1 is the temperature of the heating line (heating module, heating wire), K2 is the temperature in a concrete corner and K3 is the temperature at the concrete center (surface of the segment). It can be seen that at the time T3 the heating current is applied into the heating line 5. This is applied to terminals 6A and 6B in order to cause the heating wire 5 to increase in temperature. As can be seen, as soon as a current of about 80 to 90 A flows through the heating wire 5, the temperature rises almost linearly and the temperature of the concrete also rises with the temperature of the heating wire, delayed by a short time. In that way the bonding material, in the specific case therefore the epoxy resin, can rapidly harden and the operation of laying down further segments can progress quickly. Thus, even though the ambient air remains cold and even until past noon the next day, time T4 is still at −10° C. The temperature of the concrete has been caused to rise by the heating wire so that the temperature tracks that of the heating wire. The appropriate temperature can therefore be selected in order to cause the epoxy resin to be hardened and cured even though the ambient air remains cold.

It will be appreciated that it is also possible for the heating wire to be provided not only in the uppermost region of the lower segment but in addition also in the lower region of the upper segment 6 so that still more heat can be applied to the bonding material, which further accelerates hardening thereof.

The variant according to the invention, for heating a segment, has the advantage that it is highly favorable, and finally the costs of the normal steel wire which is used as the heating wire are in the region of a few hundredths of a German mark per meter.

The operation of laying such a heating wire is also very uncomplicated and can be quickly finished in production of the segment.

Therefore, there is also no disadvantage if the heating wire remains in the segment itself, even if the heating wire is not used at all because the pylon is erected in warm temperatures.

When the heating wire is provided however it is also possible to erect the pylons of wind power installations even at the cold time of the year and thus irrespective of the weather and the season.

It will be appreciated that the heating wire may be laid not only for example in a meander configuration but in any other form, even in such a way that the heating wire itself assumes the shape of a circle.

FIG. 4 shows a view of a pylon 10 comprising pylon segments, the segments being labeled 2, 4, 6, 8, etc. according to the invention which are placed one upon the other and which are braced relative to each other by means of a bracing device (not shown).

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An installation comprising:
   a pylon structure;
   mutually superposed segments forming the pylon structure and including a downwardly disposed segment and an upwardly disposed segment, each of the segments extending from a lower region to an upper region thereof, the segments being prefabricated compositions including concrete;
   a bonding material between the mutually superposed segments; and
   a heating element embedded within the prefabricated concrete of at least one of the upper region of the downwardly disposed segment and the lower region of the upwardly disposed segment toward the side of the segment, which is proximate the oppositely disposed segment.

2. The installation according to claim 1 characterized in that the heating element comprises a heating wire or a PTC resistance wire which is arranged toward the top side of the segment.

3. The installation according to claim 2 characterized in that the heating wire or the PTC resistance wire is a wire through which current flows for heating thereof.

4. The installation according to claim 1 characterized in that the heating element includes a heating wire laid in a meander configuration toward the top side of the segment.

5. The installation according to claim 1 characterized in that the heating element includes a heating wire and to heat the heating wire there is a current connecting terminal to which a current-generating device can be connected.

6. A wind power installation comprising the installation according to claim 1.

7. A wind power installation according to claim 5 wherein the current-generating device includes a welding transformer.

* * * * *